R. C. PUCKETT.
ANTIRATTLER.
APPLICATION FILED DEC. 7, 1916.
1,236,352.
Patented Aug. 7, 1917.
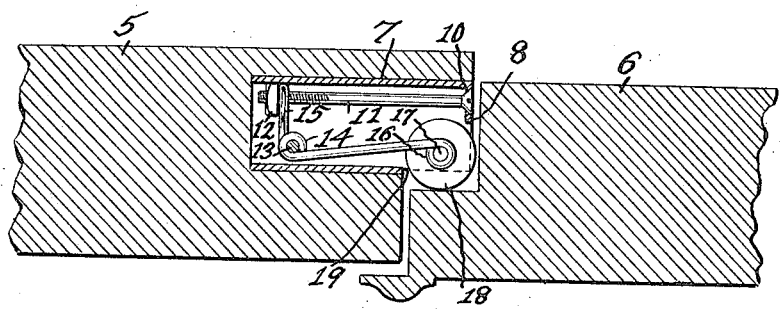
Fig. 1.
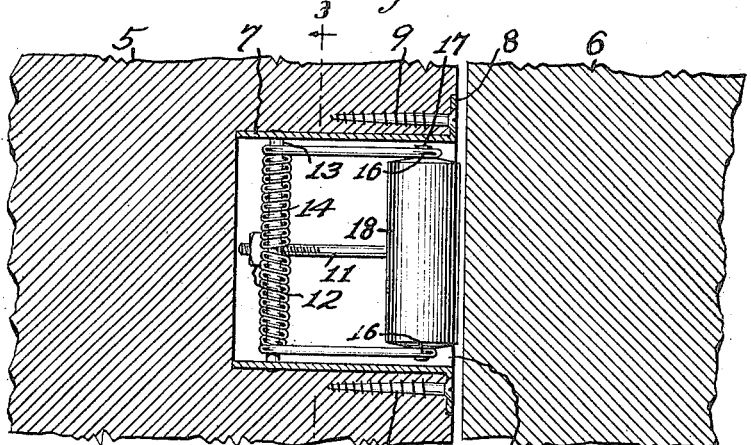
Fig. 2.
Fig. 3.
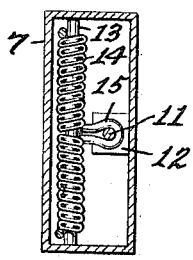
Fig. 4.
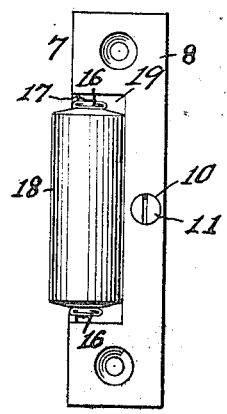
WITNESSES
Frank C. Palmer.
J. C. Larsen
INVENTOR.
R. C. Puckett
BY
ATTORNEYS

UNITED STATES PATENT OFFICE.

RALPH CLARKSON PUCKETT, OF IOWA CITY, IOWA.

ANTIRATTLER.

1,236,352.      Specification of Letters Patent.      Patented Aug. 7, 1917.

Application filed December 7, 1916. Serial No. 135,673.

*To all whom it may concern:*

Be it known that I, RALPH C. PUCKETT, a citizen of the United States, and a resident of Iowa City, in the county of Johnson and State of Iowa, have invented certain new and useful Improvements in Antirattlers, of which the following is a specification.

My invention relates to means for preventing the rattling of doors, particularly automobile doors, and the main object thereof is to provide such a device of simple construction, ready installation, maximum efficiency, and low cost, and which may be easily adjusted to meet different conditions.

My invention is fully described in the following specification, of which the accompanying drawings form a part, in which like characters refer to like parts in each of the views, and in which:—

Figure 1 is a fragmentary sectional plan view taken through an automobile body and door provided with my invention;

Fig. 2 is a fragmentary vertical section therethrough;

Fig. 3 is a section through the device taken on the line 3—3 of Fig. 2; and

Fig. 4 is an edge view of the device.

Referring to the drawings, 5 represents the body of an automobile and 6 one of the doors thereof, each being rabbeted and the former being recessed to receive a casing 7 provided with a face plate 8 adapted to be secured to the edge of the body 5 by screws 9.

The face plate 8 has a countersunk hole 10 therein serving as a seat for a flat-head screw 11 having a nut 12 adjacent its threaded end and said casing carries a fixed vertical post 13 therein serving as a support for a coiled spring 14 the middle of which is formed into an extended loop 15 encircling the screw 11 and bearing against the inner face of the nut 12 and the ends of which are extended and formed into loops 16 for the reception of the ends of a spindle 17 carrying a roller 18 preferably of rubber, or other suitable material. located in a slot 19 in the casing 7 and extending outwardly of the latter.

The angular arrangement of the spring loop and ends tends, because of the post 13 and nut 12, to force the door 6 outwardly to the limit of its latch, not shown, and thus prevent rattling of the door and, if the screw 11 be rotated the nut 12 is moved axially thereon in a corresponding direction, thus affecting the tension of the spring 14, the flat side of the nut bearing against the inner side of the casing preventing rotation thereof in the rotation of the screw.

My invention is very simple though highly efficient and meets a recognized need and, while I have shown a practical embodiment of the invention, I reserve the right to make changes thereover provided such changes come within the scope of the appended claim and do not depart from the spirit of the invention.

Having fully described my invention, what I claim as new, and desire to secure by Letters Patent, is:—

A device of the class described, comprising a casing slotted at one side, a face plate thereon adapted to be secured to a door frame recessed to receive said casing, a screw rotatably held in said face plate and extended into said casing, a nut on said screw having a flat side bearing against the interior of said casing to prevent its rotation in the rotation of said screw, a post fixed in said casing, a spring bent centrally to form a loop encircling said screw and bearing against said nut, said spring being coiled about said post with the ends thereof extended toward said slot and formed into eyes, a spindle held in said eyes, and a roller carried by said spindle and normally projected through said slot by means of said spring.

RALPH CLARKSON PUCKETT.

Copies of this patent may be obtained for five cents each, by addressing the "Commissioner of Patents, Washington, D. C."